(12) United States Patent
Burns et al.

(10) Patent No.: US 7,097,203 B2
(45) Date of Patent: Aug. 29, 2006

(54) INFLATOR

(75) Inventors: Sean P. Burns, Almont, MI (US); Bruce A. Stevens, Oakland, MI (US); Steven M. Dunham, Mt. Clemens, MI (US); Graylon K. Williams, Warren, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 373 days.

(21) Appl. No.: 10/662,771

(22) Filed: Sep. 15, 2003

(65) Prior Publication Data

US 2004/0084885 A1    May 6, 2004

Related U.S. Application Data

(60) Provisional application No. 60/410,470, filed on Sep. 13, 2002.

(51) Int. Cl.
*B60R 21/28* (2006.01)
(52) U.S. Cl. ..................................... 280/741
(58) Field of Classification Search ................ 280/741, 280/740; 149/19.2, 76, 46, 61
See application file for complete search history.

(56) References Cited

U.S. PATENT DOCUMENTS

| | | | |
|---|---|---|---|
| 3,397,639 A | 8/1968 | Alderfer | |
| 3,606,377 A | 9/1971 | Martin | |
| 3,721,456 A | 3/1973 | McDonald | |
| 3,733,088 A | 5/1973 | Stephenson | |
| 3,799,573 A | 3/1974 | McDonald | 280/150 |
| 3,897,961 A | 8/1975 | Leising et al. | |
| 3,904,221 A | 9/1975 | Shiki et al. | |
| 3,929,074 A | 12/1975 | San Miguel | |
| 4,005,876 A | 2/1977 | Jorgenson et al. | 280/741 |
| 4,012,211 A | 3/1977 | Goetz | |
| 4,200,615 A | 4/1980 | Hamilton et al. | 422/166 |
| 4,322,385 A | 3/1982 | Goetz | |
| 4,358,998 A | 11/1982 | Schneiter et al. | |
| 4,846,368 A | 7/1989 | Goetz | |
| 4,878,690 A | 11/1989 | Cunningham | 280/741 |
| 4,890,860 A | 1/1990 | Schneiter | |
| 5,094,475 A | 3/1992 | Olsson et al. | 280/741 |
| 5,109,772 A | 5/1992 | Cunningham et al. | |
| 5,139,588 A | 8/1992 | Poole | 149/61 |
| 5,308,370 A | 5/1994 | Kraft et al. | |
| 5,322,322 A | 6/1994 | Bark et al. | 280/730 |
| 5,409,259 A | 4/1995 | Cunningham et al. | |

(Continued)

FOREIGN PATENT DOCUMENTS

DE     WO 01/08936     7/2000     ................... 21/26

(Continued)

*Primary Examiner*—Faye M. Fleming
(74) *Attorney, Agent, or Firm*—L.C. Begin Associates, PLLC

(57) ABSTRACT

An inflator 10 of a vehicle occupant protection system contains an elongated housing 12 having a plurality of gas exit orifices 14 spaced along the length thereof. A first propellant body 31 and a second propellant body 33 are provided in lengths substantially equivalent to the length of the housing 12 wherein the first propellant body 31 is placed in physical contact with the second propellant body 33 for all or most of their respective lengths. Once the first propellant body 31 is ignited upon a crash event, resultant uniform ignition and combustion across the length of the second propellant body 33 results in uniform gas generation and uniform inflation of an airbag 26, wherein the airbag 26 is at least substantially coextensive with and in fluid communication with the housing 12. Preferred mixtures of first propellant body 31 contain silicone, a perchlorate oxidizer, and a nitrate salt.

12 Claims, 3 Drawing Sheets

U.S. PATENT DOCUMENTS

| | | | |
|---|---|---|---|
| 5,439,250 A | 8/1995 | Kokeguchi et al. | 280/736 |
| 5,443,286 A | 8/1995 | Cunningham et al. | |
| 5,462,308 A | 10/1995 | Seki et al. | 280/749 |
| 5,464,249 A | 11/1995 | Lauritzen et al. | |
| 5,503,079 A | 4/1996 | Kishi et al. | |
| 5,540,154 A | 7/1996 | Wilcox et al. | |
| 5,540,459 A | 7/1996 | Daniel | 280/728 |
| 5,542,704 A | 8/1996 | Hamilton et al. | 280/741 |
| 5,547,638 A | 8/1996 | Rink et al. | 422/164 |
| 5,562,303 A | 10/1996 | Schleicher et al. | 280/736 |
| 5,573,271 A | 11/1996 | Headly | |
| 5,588,672 A | 12/1996 | Karlow et al. | 280/730 |
| 5,623,115 A | 4/1997 | Lauritzen et al. | |
| 5,626,360 A | 5/1997 | Lauritzen et al. | |
| 5,635,665 A | 6/1997 | Kishi et al. | |
| 5,739,460 A | 4/1998 | Knowlton et al. | 102/324 |
| 5,743,556 A | 4/1998 | Lindsey et al. | 280/736 |
| 5,827,996 A | 10/1998 | Yoshida et al. | 149/45 |
| 5,845,933 A | 12/1998 | Walker et al. | |
| 5,875,933 A | 12/1998 | Walker et al. | 280/741 |
| 5,868,424 A | 2/1999 | Hamilton et al. | |
| 5,871,228 A | 2/1999 | Lindsey et al. | 280/728.2 |
| 5,967,550 A | 10/1999 | Shirk et al. | |
| 6,019,861 A | 2/2000 | Canterberry et al. | 149/19.1 |
| 6,029,994 A | 2/2000 | Perotto et al. | 280/736 |
| 6,032,979 A | 3/2000 | Mossi et al. | 280/741 |
| 6,039,820 A | 3/2000 | Hinshaw et al. | 149/45 |
| 6,051,158 A | 4/2000 | Taylor et al. | |
| 6,056,319 A | 5/2000 | Ruckdeschel et al. | |
| 6,062,143 A | 5/2000 | Grace et al. | |
| 6,077,371 A | 6/2000 | Lundstrom et al. | |
| 6,142,518 A | 11/2000 | Butt et al. | |
| 6,145,876 A | 11/2000 | Hamilton | |
| 6,156,137 A | 12/2000 | Lundstrom et al. | 149/45 |
| 6,170,867 B1 | 1/2001 | Rink et al. | |
| 6,176,517 B1 | 1/2001 | Hamilton et al. | |
| 6,177,028 B1 | 1/2001 | Kanda et al. | |
| 6,274,064 B1 | 8/2001 | Wheatley | 252/186.21 |
| 6,315,847 B1 | 11/2001 | Lee et al. | |
| 6,347,566 B1 | 2/2002 | Rabotinsky et al. | |
| 6,416,599 B1 | 7/2002 | Yoshikawa et al. | |
| 6,497,429 B1 | 12/2002 | Matsumoto | |
| 6,595,547 B1 | 7/2003 | Smith | |
| 6,601,871 B1 | 8/2003 | Fischer | |
| 6,688,231 B1 | 2/2004 | Herrmann | |
| 6,752,421 B1 | 6/2004 | Khandhadia et al. | |
| 6,755,438 B1 | 6/2004 | Rink et al. | |
| 6,846,013 B1 | 1/2005 | Smith | |
| 6,886,469 B1 | 5/2005 | Shilliday | |

FOREIGN PATENT DOCUMENTS

| | | | |
|---|---|---|---|
| DE | WO 01/08937 | 7/2000 | 21/26 |
| JP | 5-64015 | 8/1993 | |
| WO | WO 9532165 A1 * | 11/1995 | |

* cited by examiner

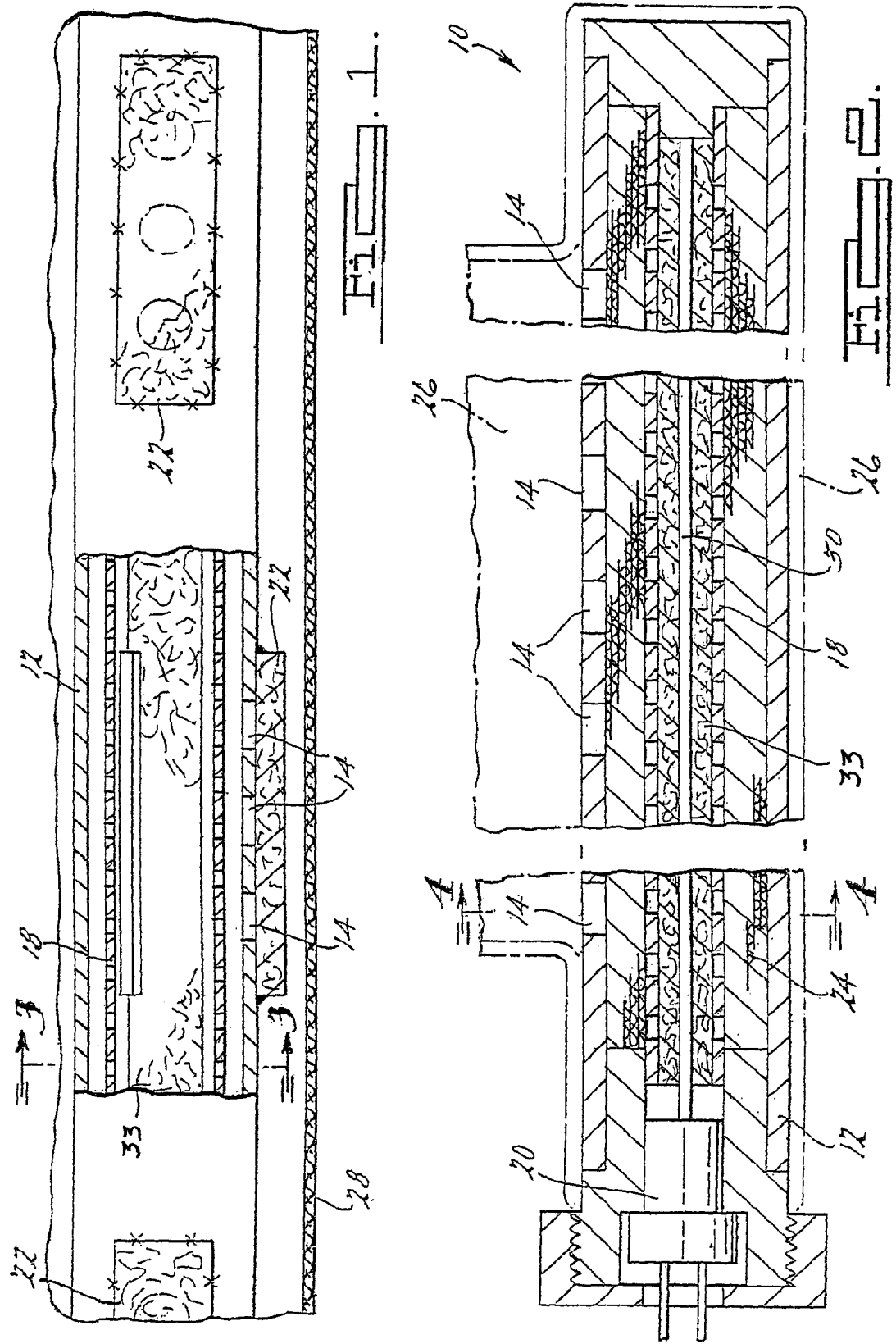

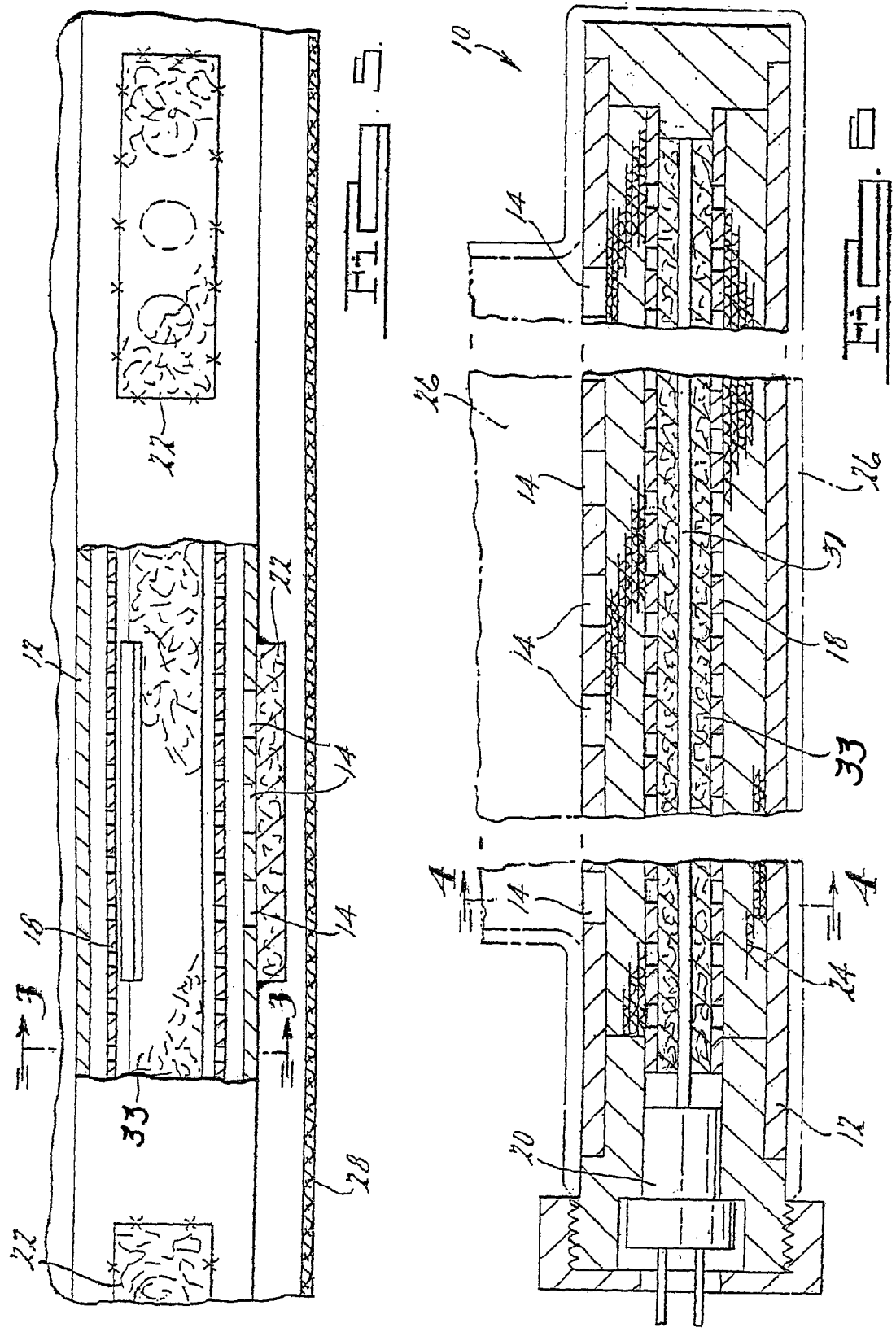

INFLATOR

CROSS REFERENCE TO RELATED APPLICATIONS

This application claims the benefit of provisional application Ser. No. 60/410,470 filed on Sep. 13, 2002.

BACKGROUND OF THE INVENTION

The present invention relates to gas generators used to inflate air bags in an automobile occupant protection system and, more particularly, to a head curtain inflator designed to protect the occupants of a vehicle during a rollover accident. The novel design provides a steady and uniform production of gas thereby providing sustained inflation of the airbag, and is particularly useful as a linear head side airbag inflator.

Inflation systems for deploying an air bag in a motor vehicle generally employ a gas generator in fluid communication with an uninflated air bag. The gas generator is typically triggered by a firing circuit when the sensed vehicle acceleration exceeds a predetermined threshold value, as through the use of an acceleration-responsive inertial switch.

Air bag inflation systems designed for rollover accidents often utilize a gas generator stored within the B-pillar of the car, for example. Hybrid gas generators are typical and contain pressurized gas that is released upon receipt of a predetermined signal. The gas must then be transferred to the point of application and thus requires additional plumbing.

Certain known side-impact inflators require plumbing to convey gas generated in a relatively remote gas generator to the airbag, thus complicating the manufacturing of the vehicle occupant protection system and furthermore resulting in a relative delay prior to airbag inflation.

Other known gas generators sometimes result in less than optimum inflation profiles. For example, original equipment manufacturers oftentimes require sustained inflation of the airbag thereby ensuring continued protection during a rollover accident. To ensure sustained inflation, gas generant compositions must exhibit sustained combustion over the desired or required time.

Gas quantities plumbed to the airbag are often not uniform across s the inflation profile of the airbag. Stated another way, a portion of the airbag may inflate or pressurize to a greater degree than another portion of the airbag. As a result, the airbag may provide less protection in the regions not completely inflated.

As such, a challenge remains to provide sustained and uniform inflation across the length of airbag employed for vehicular side-impact protection.

Related vehicle occupant protection systems are known. U.S. Pat. Nos. 5,322,322, 5,094,475, 3,733,088, 5,540,459, 5,588,672, and 5,921,576 are cited by way of example and are herein incorporated by reference.

SUMMARY OF THE INVENTION

The above-referenced concerns are resolved by a vehicle occupant protection system of the present invention. In accordance with the present invention, a side-impact head curtain inflator contains an elongated housing. Gas exit apertures are spaced along the length of the housing thereby facilitating the release of gas. A primary propellant body is contained within the housing and is substantially coextensive therewith. An ignition body such as a first propellant body or a rapid deflagration cord is juxtaposed or contained within the primary or second propellant body and is substantially coextensive and in physical contact therewith. An airbag or side-impact head curtain airbag extends along the length of the housing and is in fluid communication therewith.

In a preferred embodiment, first and second propellant bodies contains a mixture of silicone as a fuel and an oxidizer. The pliant nature of silicone promotes the extrusion of a long cylindrical body coextensive with the housing. In a preferred embodiment, the first propellant body is juxtaposed to and in physical contact with the cylindrical second propellant body.

Silicone employed as a fuel results in a sustained burn and therefore sustained combustion. The first propellant body or the ignition body provides an essentially simultaneous ignition and burn across the length of the propellant. As a result, gas exiting the gas exit orifices spaced along the length of the housing uniformly inflates an airbag sealed about the length of the housing and in fluid communication therewith. In operation, once a crash event occurs, the airbag is immediately deployed exhibiting a sustained and uniform inflation profile across the length of the housing.

BRIEF DESCRIPTION OF THE DRAWINGS

FIG. 1 illustrates a first embodiment of the present invention taken in partial section and partial elevation.

FIG. 2 illustrates a second embodiment of the present invention taken in section.

FIG. 5 illustrates a third embodiment of the present invention.

FIG. 6 illustrates a fourth embodiment of the present invention.

DETAILED DESCRIPTION OF THE PREFERRED EMBODIMENTS

Figure 3:
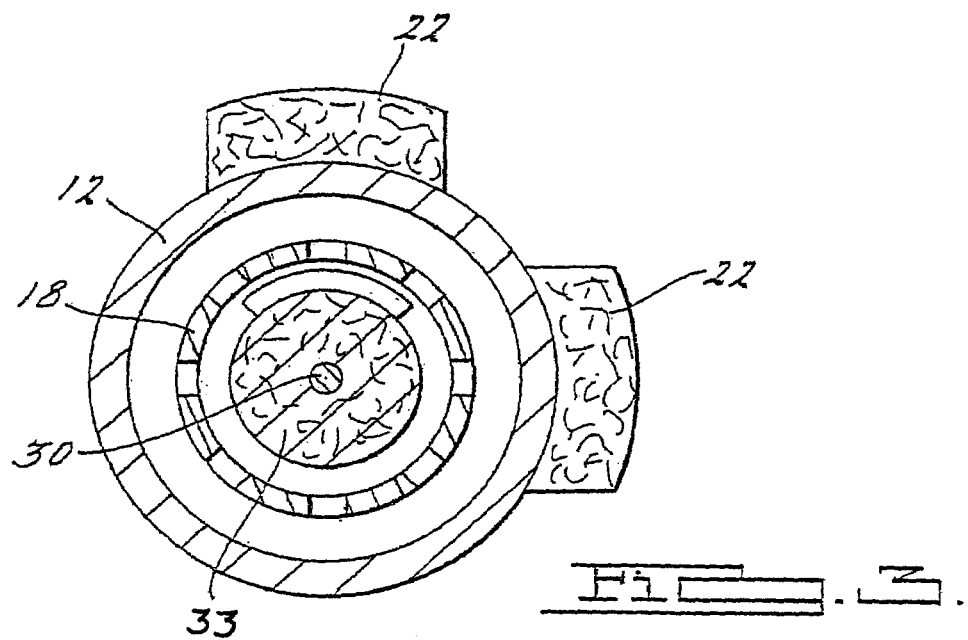
FIG. 3 illustrates a cross-section of the first embodiment taken along the line 3—3 of FIG. 1.
Figure 4:
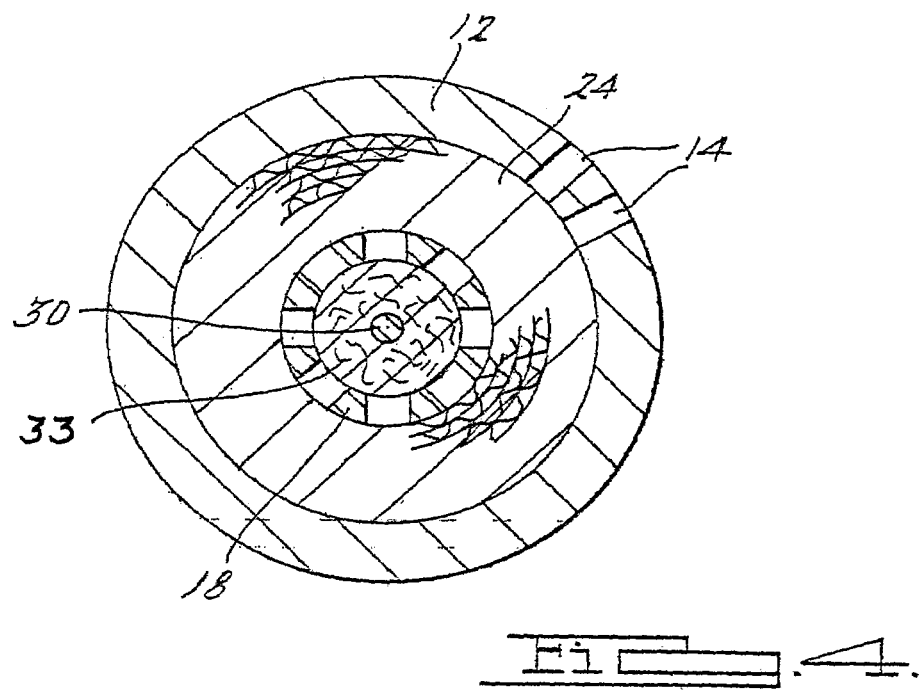
FIG. 4 illustrates a cross-section of the second embodiment of FIG. 2.

In accordance with the present invention a gas generator 10 comprises an elongated housing 12, made from a rigid material such as carbon steel. A plurality of gas exit orifices 14 is spaced along the length of the housing 12. The housing 12 is preferably formed from a carbon steel pipe or tube. The dimensions are based on design specifications. A propellant charge 33 may be disposed within an optional and substantially coextensive perforated tube 18 within the housing 12. A standard igniter 20 or initiator assembly is disposed at one end of the housing 12 and communicates with a signal from a firing circuit thereby initiating operation of the inflator 10. A plurality of filter screens 22 is fixed to the external surface of the housing 12 whereby a filter screen 22 covers each gas outlet 14. See FIGS. 1 and 3. The welded wire mesh filters 22 are readily obtainable from suppliers such as Wayne Wire, Inc. of Kalkaska, Mich.

Alternately, a woven wire sock 24, also made by Wayne Wire, Inc., may be used to cover the perforated tube 18 containing the propellant charge and thereby provide suitable filtration of the combustion products. Or, the annular filter sock 24, substantially coextensive with the propellant charge 33, may simply encase the propellant across its respective length if a perforated tube 18 is not provided. Once covered with the woven wire sock 24, the perforated tube 18 is then inserted into the housing 12. The need to weld wire mesh filters 22 on the external surface 32 of the housing 12 is thus eliminated. See FIGS. 1 and 3.

The propellant charge 33 should essentially extend for all or most of the length of the housing 12 thereby facilitating a substantially uniform gas generation once the primary propellant body 33 is ignited. Uniform gas generation across the length of the inflator 10 is desirable so that an airbag 26, fixed and sealed over the length of the housing 12, is uniformly inflated. An insulating material 28 such as woven glass fiber (made by BGF Industries, Inc. of Greensboro, N.C. for example) or other materials known by their tradenames such as NOMEX (made by Dupont) or KYNOL (made by Nippon Kynol of Japan) is disposed about the periphery of the housing and functions to inhibit heat transfer from the housing to the airbag. The plurality of gas outlets 14 fluidly communicate with the airbag 26 once the primary propellant body 33 is ignited and thereby provide sustained and uniform inflation over the length of the airbag 26.

The propellant charge 33 is formed into a single cylindrical or elongated extrusion that is at least substantially if not essentially coextensive with the housing 12 and the perforated tube 18. The housing 12 also contains an ignition compound 30 in the form of a string or wick coextensively communicating with the propellant charge 33. Stated another way, the propellant charge 33 and the wick 30 are at least substantially, if not completely, in physical contact for their respective lengths. The wick 30 is an ignitable material such as, but not limited to, cesium potassium nitrate. The wick 30, for example, is readily obtainable from McCormick Selph, Inc. of Hollister, Calif. and is thus marketed as a tin or metal sheath pyrotechnic cord known as RDC (Rapid Deflagrating Cord). The wick 30 is connected to the igniter 20 and is quickly ignited across its length upon actuation of the inflator firing circuit. In general, the wick 30 burns about ten times as fast as the propellant charge 33. Ignition of the wick 30 thereby facilitates uniform combustion of the propellant charge 33 and uniform generation of gas.

The primary propellant body 33 generally comprises a mixture of silicone as a fuel at about 10–25% by weight, and an oxidizer such as ammonium or potassium perchlorate at about 75–90% by weight. Silicone not only functions as a fuel but also functions as a binder thereby facilitating the formation of pliant cylindrical propellant extrusions.

The primary propellant body 33 preferably comprises silicone as a fuel at about 10–25% by weight; a perchlorate oxidizer such as ammonium, lithium, or potassium perchlorate; and a strontium salt such as strontium nitrate or strontium carbonate as a coolant, wherein the oxidizer and coolant comprise about 75–90% by weight of the propellant. The silicone may be purchased, for example, from General Electric or other well-known suppliers. The other gas generant constituents may be provided by suppliers or by manufacturing methods well known in the art.

The propellant composition more preferably comprises, in percents by weight, 10–25% silicone, 75–90% oxidizer, 1–30% coolant, and 1–20% of a slag-forming constituent. The oxidizer may for example be selected from inorganic perchlorates and nitrates such as sodium perchlorate, potassium perchlorate, ammonium perchlorate, potassium nitrate, ammonium nitrate, and phase stabilized ammonium nitrate. The coolant may for example be selected from metal hydroxides such as aluminum hydroxide; metal carbonates such as calcium carbonate, magnesium carbonate, strontium carbonate, and sodium carbonate; and inorganic oxalates such as calcium oxalate, strontium oxalate, and ammonium oxalate. The slag-forming constituent may for example be selected from metal oxides such as aluminum oxide and iron oxide. It has been found that gas generating compositions containing silicone and a perchlorate oxidizer burn at relatively lower temperatures when a coolant, in accordance with the present invention, is added to the mixture. As a result, cooling requirements of gas generated within the inflator 10 can be substantially minimized.

When used within a vehicle, the inflator 10 is preferably mounted within the headliner on either side of the vehicle wherein the length of the inflator 10 runs substantially parallel with the length of the vehicle. Each side of the vehicle would thus contain an inflator 10 as described above. When actuated by remote fire circuitry, the airbag 26 is forced down from the headliner thereby covering the side windows and providing a cushion during a rollover or other type of accident. The present invention exceeds customer requirements of at least five seconds of sustained inflation of an airbag 26 in fluid communication with the gas generators.

In yet another embodiment, the inflator may contain two discrete propellant bodies wherein a first propellant body 31 is juxtaposed to a second propellant body 33 for the length of the inflator. The first propellant body 31 would behave in much the same way as the ignition cord but would replace the ignition cord and therefore reduce the manufacturing cost. Furthermore, the first propellant body 31 would not be required to be formed within the second propellant body 33 as is the rapid deflagration cord in the other embodiments. As presently understood, the first propellant body 31 functions not only to ignite the second slower burning propellant body but also to initially deploy the airbag. The first propellant preferably burns at least twice as fast as the second propellant. At that point, the slower burning second propellant body 33 sustains combustion to provide a sustained inflation of the airbag as per customer requirements. The first propellant generally contains by weight 8–30% curable silicone, 52–87% of an oxidizing perchlorate salt such as lithium perchlorate, potassium perchlorate, or ammonium perchlorate, and 5–18% of a nitrate salt, preferably strontium nitrate. The first propellant preferably contains by weight 12–30% curable silicone, 70–88% of an oxidizing perchlorate salt such as lithium perchlorate, potassium perchlorate, or ammonium perchlorate, and 5–18% of a nitrate salt, preferably strontium nitrate. Strontium nitrate actually functions to slow the burn rate if necessary. A most preferred composition for the first propellant body 31 contains about 21% silicone, 63% potassium perchlorate, and 16% strontium nitrate. Other perchlorate oxidizers include sodium perchlorate, ammonium perchlorate, lithium perchlorate, and mixtures thereof. Other nitrate salts include potassium nitrate, ammonium nitrate, phase stabilized ammonium nitrate, and mixtures thereof.

The second propellant body 33 or slower burning propellant readily ignites and burns at a relatively slower rate (compared to the first propellant body 31) thereby providing sustained inflation of the airbag. The second propellant preferably contains potassium perchlorate to aid ignition, a coolant such as azodicarbonamide (a popular blowing agent in the plastics industry) or ammonium nitrate, and a main oxidizer such as strontium nitrate. The second propellant preferably contains by weight 10–30% curable silicone, 30–50% of an oxidizing perchlorate salt such as lithium perchlorate, potassium perchlorate, or ammonium perchlorate, and 30–50% of a nitrate salt, preferably strontium nitrate. The preferred formulation for the second propellant is about 21% silicone, 39.5% potassium perchlorate, and 39.5% strontium nitrate. Other nitrate salts and perchlorate oxidizers may be used as described relative to the first propellant body 31, for example.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A gas generator for a vehicle occupant protection system comprising:
    an elongated housing having a predetermined length and having a first end and a second end;
    a plurality of gas exit orifices spaced along the length of said housing;
    a first propellant body contained within said housing, said first propellant body having a length substantially coextensive with said housing and said first propellant body comprising 8–30% by weight of silicone, 52–87% by weight of an oxidizing perchlorate salt; and 5–18% by weight of a nitrate salt; and
    a second propellant body substantially coextensive with said first propellant body, said second propellant body in physical contact with said first propellant body for substantially the length of said first propellant body, said second propellant body comprising 10–30% curable silicone, 30–50% of an oxidizing perchlorate salt, and 30–50% of a nitrate salt,
    wherein ignition of said first propellant body essentially provides uniform ignition and combustion of said second propellant body along the entire length thereof.

2. The gas generator of claim 1 further comprising a perforated sleeve contained within said housing and substantially coextensive therewith, wherein said first and second propellant bodies are housed within said sleeve.

3. The gas generator of claim 1 further comprising a plurality of filters wherein each filter corresponds to and is fixed over at least one gas exit orifice in said plurality of gas exit orifices thereby filtering gases exiting the gas generator.

4. The gas generator of claim 2 further comprising an annular filter contained within said housing and substantially coextensive therewith, wherein said annular filter encases said perforated sleeve.

5. The gas generator of claim 1 further comprising an insulator wrapped about said housing wherein said insulator has a plurality of gas exit apertures corresponding to said plurality of gas exit orifices.

6. The gas generator of claim 1 wherein said first propellant body consists essentially of by weight about 21% silicone, about 63% potassium perchiorate, and about 16% strontium nitrate.

7. The gas generator of claim 1 wherein said second propellant is by weight about 21% silicone, 39.5% potassium perchlorate, and 39.5% strontium nitrate.

8. A gas generator for a vehicle occupant protection system comprising:
    an elongated housing having a predetermined length and a plurality of gas exit orifices spaced along said length, said housing having a first end and a second end;
    a first propellant body contained within said housing, said first propellant body having a length substantially coextensive with said housing, said first propellant comprising a mixture of silicone as a fuel at about 10–25%, a perchiorate oxidizer at about 75–90%, and a nitrate salt at about 5–18%, said percentages stated by weight of said first propellant body; and
    a second propellant body substantially coextensive wit said first propellant body, wherein said second propellant body is in physical contact with said first propellant body for substantially the length of said first propellant body,
    wherein ignition of said first propellant body provides essentially uniform ignition and combustion of said second propellant body along the entire length thereof.

9. The gas generator of claim 8 wherein said oxidizer is selected from the group consisting of sodium perchlorate, ammonium perchlorate, lithium perchiorate, and potassium pci-chlorate.

10. The gas generator of claim 8 wherein said nitrate salt is selected from the group consisting of strontium nitrate, potassium nitrate, ammonium nitrate, phase stabilized ammonium nitrate, and mixtures thereof.

11. The gas generator of claim 8 wherein said second propellant body further comprises a coolant selected from the group consisting of metal hydroxides, metal carbonates, inorganic oxalates, and mixtures thereof, said coolant provided at about 1–30% by weight of said propellant body.

12. The gas generator of claim 6 wherein said propellant mixture further comprises strontium carbonate at about 1–30% by weight of said propellant body.

* * * * *